(12) United States Patent
Smith et al.

(10) Patent No.: US 9,492,979 B2
(45) Date of Patent: Nov. 15, 2016

(54) FILAMENT WOUND INFLATORS

(71) Applicants: Bradley W. Smith, Plain City, UT (US); Michael P. Jordan, South Weber, UT (US); Earl H. Nelson, West Haven, UT (US); Alan D. Van Leer, Clearfield, UT (US); Phillip R. Anderson, Hooper, UT (US)

(72) Inventors: Bradley W. Smith, Plain City, UT (US); Michael P. Jordan, South Weber, UT (US); Earl H. Nelson, West Haven, UT (US); Alan D. Van Leer, Clearfield, UT (US); Phillip R. Anderson, Hooper, UT (US)

(73) Assignee: Autoliv ASP, Inc., Ogden, UT (US)

( * ) Notice: Subject to any disclaimer, the term of this patent is extended or adjusted under 35 U.S.C. 154(b) by 231 days.

(21) Appl. No.: 14/301,714

(22) Filed: Jun. 11, 2014

(65) Prior Publication Data

US 2015/0360428 A1 Dec. 17, 2015

(51) Int. Cl.
| | |
|---|---|
| *B29D 22/02* | (2006.01) |
| *B32B 37/14* | (2006.01) |
| *B60R 21/26* | (2011.01) |
| *B29C 70/00* | (2006.01) |
| *B29C 70/32* | (2006.01) |
| *B29C 53/56* | (2006.01) |

(52) U.S. Cl.
CPC ............... *B29D 22/02* (2013.01); *B29C 53/56* (2013.01); *B29C 70/00* (2013.01); *B29C 70/32* (2013.01); *B29D 22/023* (2013.01); *B32B 37/142* (2013.01); *B60R 21/26* (2013.01); *B60R 2021/26082* (2013.01)

(58) Field of Classification Search
CPC ................... B60R 21/26; B60R 2021/26082; B29D 22/02; B29D 22/023; B29C 53/56; B29C 70/00; B29C 70/32; B32B 37/142
See application file for complete search history.

(56) References Cited

U.S. PATENT DOCUMENTS

| | | | | |
|---|---|---|---|---|
| 3,112,234 | A | * | 11/1963 | Krupp ................... B21D 51/24 156/169 |
| 4,167,429 | A | * | 9/1979 | Ackley ................. B29B 15/125 118/125 |
| 5,045,147 | A | | 9/1991 | Benson et al. |
| 8,297,653 | B2 | | 10/2012 | Smith |
| 2005/0031843 | A1 | | 2/2005 | Robinson et al. |
| 2005/0039842 | A1 | | 2/2005 | Clark et al. |
| 2012/0234839 | A1 | | 9/2012 | Smith et al. |
| 2014/0167333 | A1 | | 6/2014 | Jordan et al. |

OTHER PUBLICATIONS

R.J. Digiantonio, "Two-Shot Molding of Thermoplastic Elastomers", May 1992, Society of Plastics Engineers ANTEC '92, Detriot, Michigan.

(Continued)

*Primary Examiner* — Jacob T Minskey
*Assistant Examiner* — Vishal I Patel
(74) *Attorney, Agent, or Firm* — Pauley Erickson & Kottis

(57) ABSTRACT

An apparatus for filament wrapping a composite material around an object includes a fixture onto which the object can be rotationally fixed at a selected angle from vertical designated $\alpha$, where $90° > \alpha > 0°$. The fixture is secured to a rotatable planar platform. The rotatable platform permits the fixture to be rotated about an axis perpendicular to the planar platform. An eyelet is provided wherethrough a composite material filament can be released to wrap the object rotationally fixed onto the fixture. Also provided are corresponding or associated methods for filament wrapping a composite material around an object and helically wrapping a composite material filament around an inflator device subassembly.

21 Claims, 4 Drawing Sheets

(56) References Cited

OTHER PUBLICATIONS

Pending U.S. Appl. No. 13/718,336, filed Dec. 18, 2012.

Manual ball winders, Ballwinders.com, 2013 (printed Jul. 9, 2015), https://web.archive.org/web/2013032611114/http:/ballwinders.com/manual_ball_winders.html.

* cited by examiner

FILAMENT WOUND INFLATORS

CROSS REFERENCE TO RELATED APPLICATION

The subject matter of this application is related to prior U.S. patent application Ser. No. 13/051,855, filed on 18 Mar. 2011, now U.S. Pat. No. 8,297,653, issued 30 Oct. 2012, the disclosure of which is hereby incorporated by reference herein and made a part hereof, including but not limited to those portions which specifically appear hereinafter.

BACKGROUND OF THE INVENTION

Field of the Invention

This invention relates generally to filament winding or wrapping and, more particularly, to filament winding or wrapping of inflator devices such as used in motor vehicle occupant safety restraint systems.

Discussion of Related Art

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags also operate to protect other or particular various parts of the body from collision.

In addition to one or more airbag cushions, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Various types or forms of inflator devices have been disclosed in the art for use in inflating an inflatable restraint system airbag cushion.

One particularly common type or form of inflator device used in inflatable passive restraint systems is commonly referred to as a pyrotechnic inflator. In such inflator devices, gas used in the inflation of an associated inflatable element is derived from the combustion of a pyrotechnic gas generating material.

Typically, pyrotechnic inflators include a pressure vessel housing so as to be able to withstand the 10 MPa to 30 MPa internal pressures created during combustion of the pyrotechnic gas generating material contained within the inflator. In practice, such pressure vessels are commonly made by welding together two or more metal, e.g., steel or aluminum, components after the loading therein of the inflator internal contents, such as the pyrotechnic gas generating material, for example.

Another particularly common type or form of inflator device used in inflatable passive restraint systems is commonly referred to as a compressed gas inflator. In such inflator devices, gas used in the inflation of an associated inflatable element is derived from stored compressed gas.

In conventional inflator devices of such type, the temperature and pressure within the gas storage chamber typically increases significantly during the initiation stage such as to provide an internal pressure sufficient to rupture a discharge end burst disk and permit gas flow from the storage chamber, through a diffuser and out to an associated inflatable airbag cushion. Thus, such inflator devices are commonly designed and constructed to have a sidewall of significant thickness to withstand the increase in internal pressure realized upon actuation of the inflator device. Unfortunately, increasing the thickness of the sidewall can result in inflator devices that are heavier and larger than desired.

Moreover, in reasonably long such pressure vessel housings having a cylindrical shape (e.g., where length is greater than diameter), the stress in the hoop direction is twice the stress in the axial direction.

Typically, compressed gas inflators include a pressure vessel housing designed so as to be able to withstand pressures in the range of 1.5 to 2 times the internal pressures created upon actuation of the compressed gas inflator, where such internal pressures are commonly at least 40 MPa up to 140 MPa, or more narrowly at least 55 MPa up to 120 MPa, or even more narrowly at least 65 MPa up to 110 MPa. In practice, such pressure vessels are typically elongated cylindrical in form and are made of steel of sufficient strength, i.e., thickness, to withstand the pressure within the vessel both during normal at-rest or pre-actuation state as well as upon actuation and functioning of the device. Moreover, desired system design and operation typically involves or includes the addition or incorporation of an appropriate safety factor to the expected actual pressures.

Automotive industry efforts directed towards inflatable restraint systems that are smaller, lighter, and less expensive to manufacture has led to the development of inflator assemblies such as disclosed in above-referenced U.S. Pat. No. 8,297,653 wherein an overwrap such as comprising a composite of fibers and a resin matrix system is applied over, on or about at least a portion of an inflator subassembly such as includes a metal housing of reduced thickness to form an inflator assembly that withstands the pressure generated therewithin upon actuation.

Commercially available filament winding machinery generally comprises a means for supporting and rotating a mandrel/part form, a means for supplying a continuous band of resin impregnated filamentary material, and a winding head which reciprocates along the length of the mandrel/part while moving both laterally and pivotally with respect to the mandrel/part for maintenance of proper filament orientation as the impregnated filament is wound around the mandrel/part form. Typically, two to six axes of movement are required to realize a desired wrap pattern, dependent on the complexity of the wrap pattern. For example, to wrap filament in the shape of "hoops" such as around a cylinder, i.e., such a wrap commonly referred to as a "hoop wrap," a machine with two axis of movement could be used. However, to wrap filament around an object such as has been desired for various inflator devices such as used or incorporated in various motor vehicle occupant safety restraint systems a filament wrap in a generally helical form or pattern, i.e., such a wrap commonly referred to as a "helical wrap," a machine or apparatus with at least four axis of rotation is typically required. For example, a first axis rotates the object along its longitudinal axis and must be turned at a variable rate depending on winding head position. A second axis moves the winding head laterally along the length of the part. A third axis moves the winding head toward the centerline of the part as the filament wraps around the ends. A fourth axis rotates the winding head to keep the filament flat on the part and prevents twists in the filament as it wraps around the end of the part when the winding head changes directions moving toward the other end of the part. A sophisticated computer program is required to synchronize the movement of all of the axes to properly place the filament and to prevent the winding head from accidently contacting the mandrel/part.

Furthermore, commercially available equipment is designed primarily for aerospace applications. As compared to motor vehicle occupant safety restraint systems such of specific interest herein, such commercial aerospace applications typically employ or are practiced on much larger parts, e.g., parts of significantly greater physical dimensions, and in much smaller production quantities. Moreover, such prior applications may have per part process times that amount to tens of minutes to even hours per part. In contrast, production processes for motor vehicle occupant safety restraint system components must typically run at processing times of no more that about 10 to 15 seconds per part in order to be commercially practical.

In view of the above, there is a need and a demand for a filament winding or wrapping apparatus and method that desirably simplifies the winding or wrapping process.

There is a need and a demand for a filament winding or wrapping apparatus and method that desirably reduces the complexity and/or sophistication of the controls or programming required to achieve the wrapping process.

There is a need and a demand for a filament winding or wrapping apparatus and method that desirably reduces the time period required to achieve a desired wind or wrap such as whereby mass production of filament wound or wrapped objects such as inflator devices such as used or incorporated in various motor vehicle occupant safety restraint systems can be realized.

SUMMARY OF THE INVENTION

A general object of the invention is to provide an improved filament winding/wrapping apparatus and method.

A more specific objective of the invention is to overcome one or more of the problems described above.

In one aspect of the invention, there is provided an apparatus for filament wrapping a composite material around an object. In one embodiment, such an apparatus includes a fixture onto which the object to be wrapped can be rotationally fixed at a selected angle from vertical designated $\alpha$, where $90°>\alpha>0°$. The apparatus further includes a rotatable planar platform whereon the fixture is secured. The rotatable platform serves to permit the fixture to be rotated about an axis perpendicular to the planar platform. An eyelet is provided wherethrough a composite material filament can be released to wrap the object rotationally fixed onto the fixture.

In another aspect of the invention, there is provided a method for filament wrapping a composite material around an object. A method in accordance with one embodiment involves fixing the object onto a fixture of a filament wrapping apparatus at a selected angle from vertical designated $\alpha$, where $90°>\alpha>0°$. The filament wrapping apparatus has at least one of a primary and a secondary axis of rotation whereabout the object fixed onto the fixture is rotatable. The primary axis of rotation involves the fixture being secured onto a rotatable platform with the primary axis of rotation being perpendicular to the planar platform. The secondary axis of rotation longitudinally extends through the object. A composite material filament is released through an eyelet to wrap about the fixed object while rotation occurs about at least one of the primary and secondary axis of rotation.

In another aspect of the invention, there is provided a method for helically wrapping a composite material filament around an inflator device subassembly. In one embodiment, such a method involves fixing the inflator device subassembly onto a fixture of a filament wrapping apparatus at a selected angle from vertical designated $\alpha$, where $90°>\alpha>0°$. The fixture is secured onto a rotatable platform with a primary axis of rotation being perpendicular to the planar platform. The filament wrapping apparatus has a secondary axis of rotation extending through the inflator device and whereabout the inflator device subassembly fixed onto the fixture is rotatable. A composite material filament is released through an eyelet to helically wrap about the fixed inflator device subassembly while rotation occurs about at both the first and second axis of rotation.

Other objects and advantages will be apparent to those skilled in the art from the following detailed description taken in conjunction with the appended claims and drawings.

DETAILED DESCRIPTION OF THE INVENTION

Figure 1:
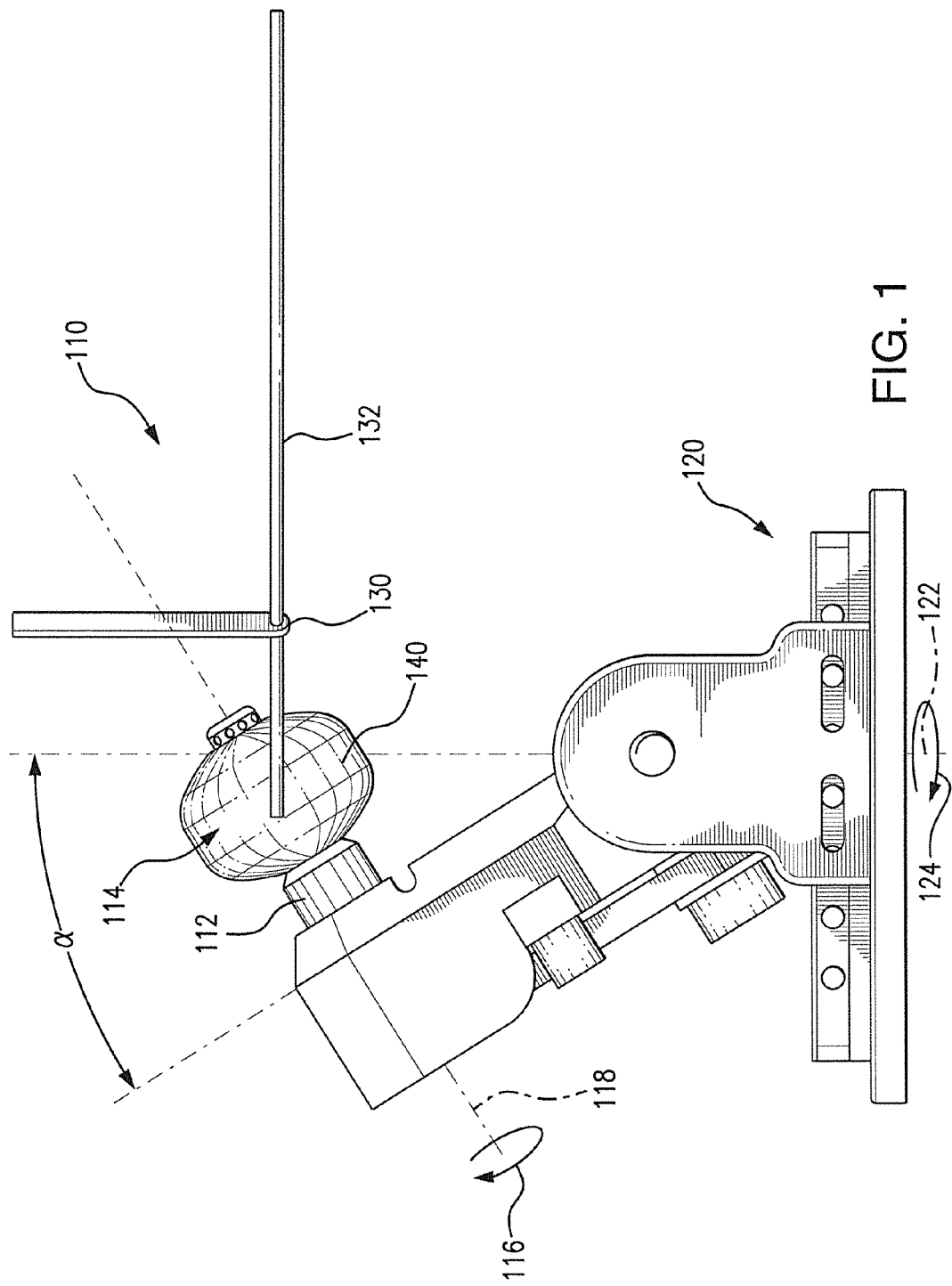
FIGS. 1-4 are simplified front, left side, back and right side views, respectively, showing a filament winding/wrapping apparatus in accordance with one embodiment of the invention and showing the winding/wrapping of a filament over, on or about at least a portion of an inflator subassembly.
Figure 2:
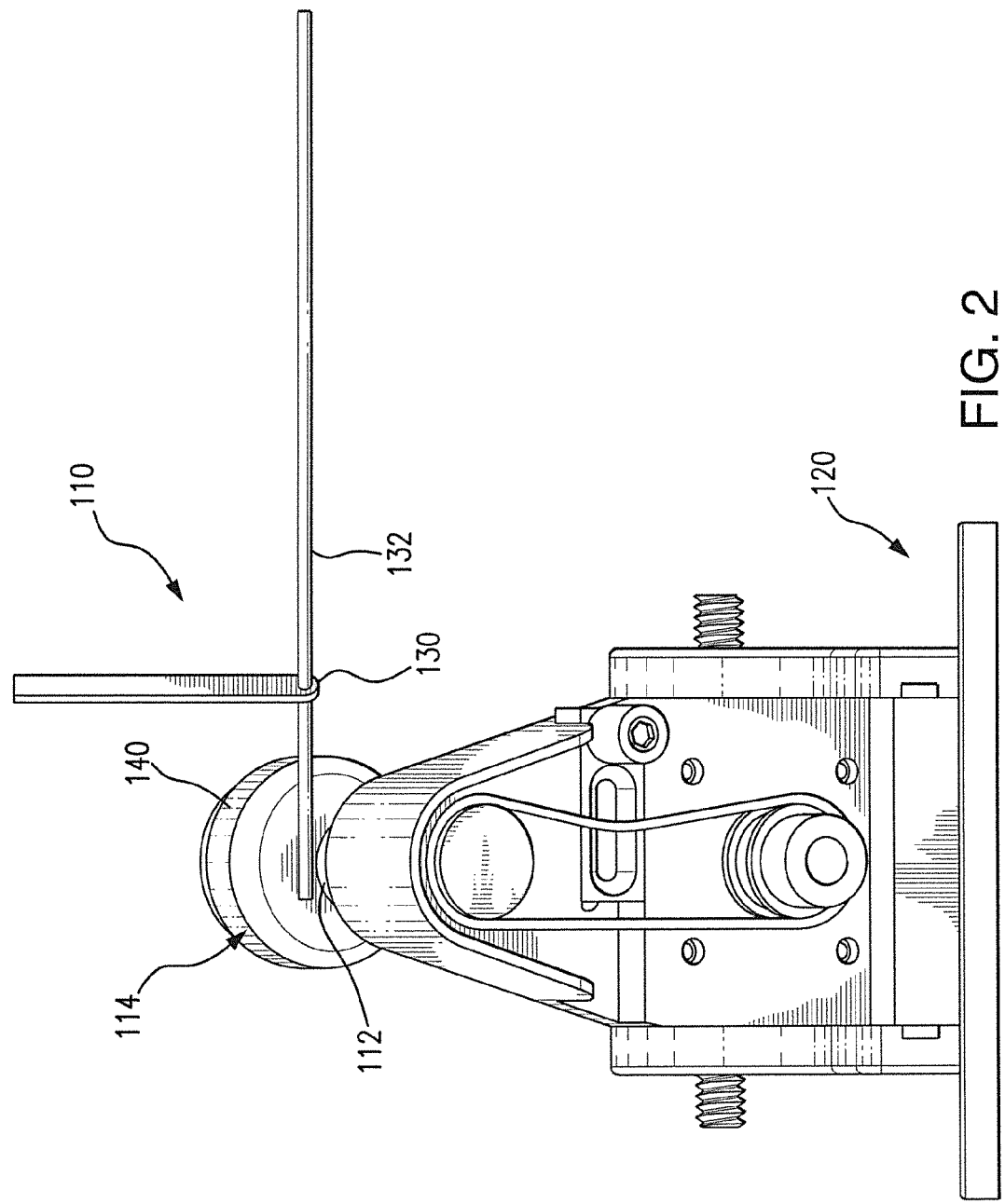
Figure 3:
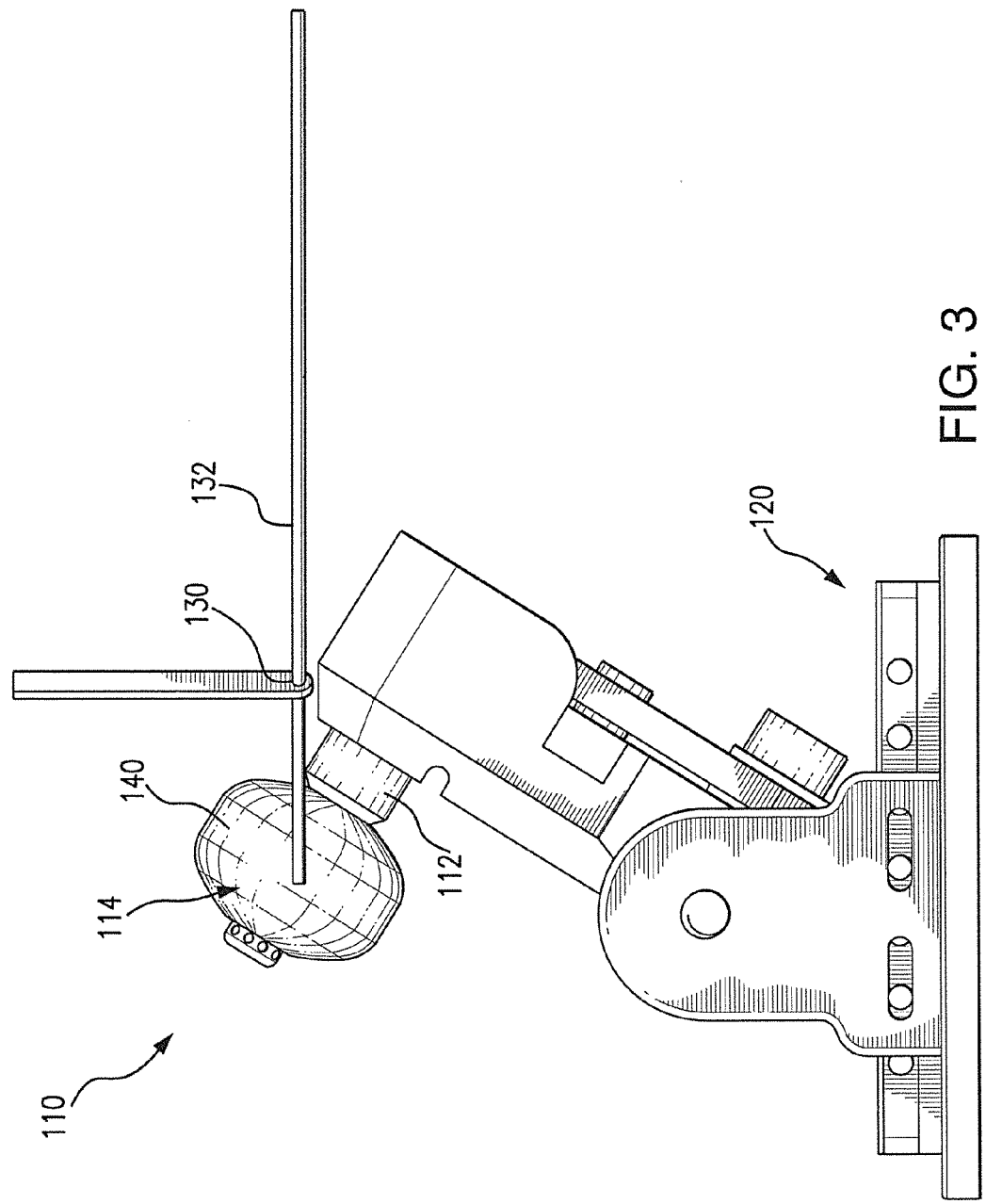
Figure 4:
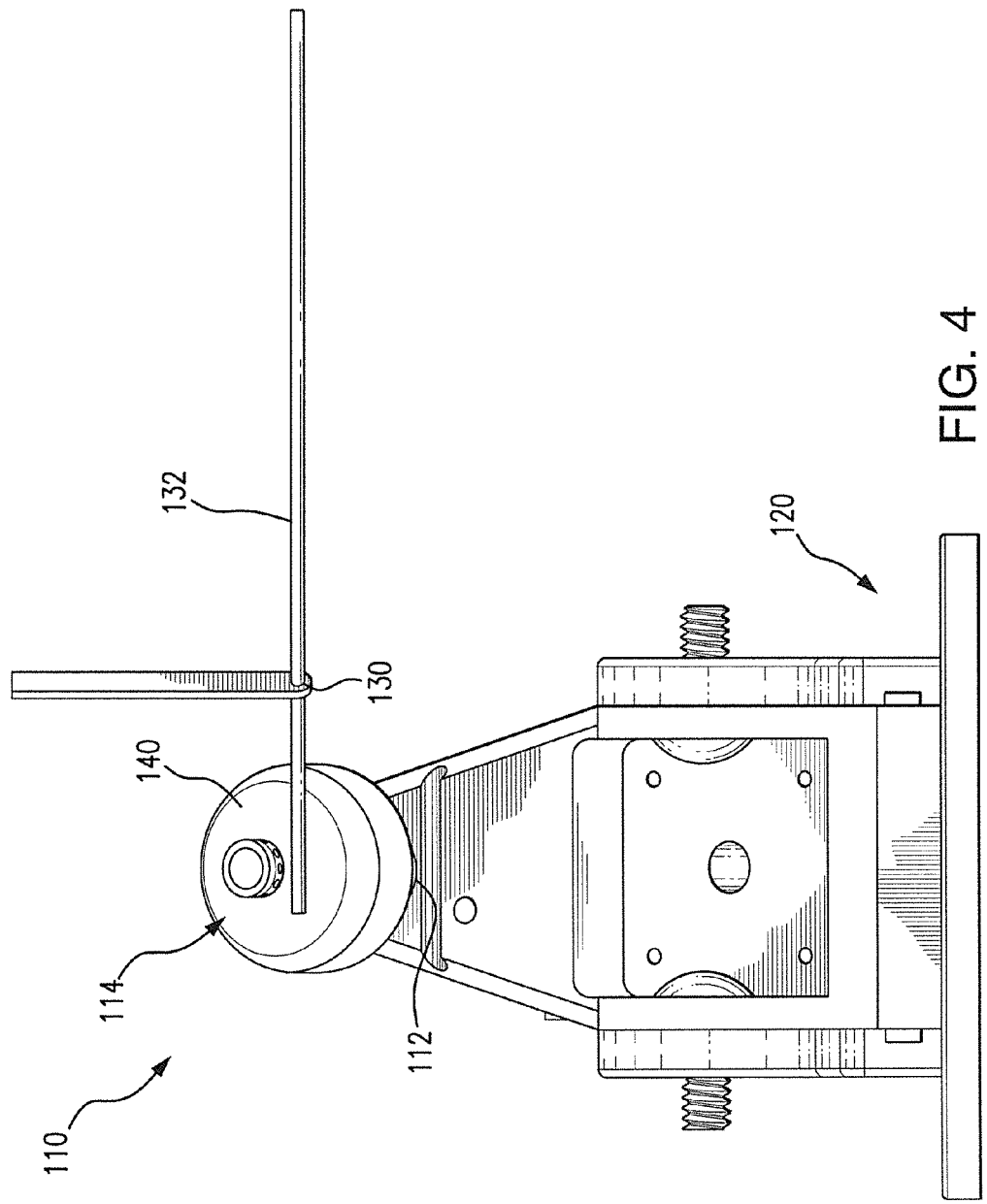

The present invention provides an improved filament winding or wrapping apparatus and method.

Turning to figures, there is shown a filament winding/wrapping apparatus, generally designated by the reference numeral 110, in accordance with one embodiment of the invention. While the invention is more specifically described below making reference to filament winding/wrapping wherein the object being wound/wrapped is an inflator subassembly such as may be used in motor vehicle occupant safety restraint systems, those skilled in the art will understand and appreciate that the broader practice of the invention is not necessarily so limited. That is while the winding/wrapping of inflator subassemblies is of perceived great present interest, the invention can be applied to the winding/wrapping of a variety of items including, for example: small pressurized fuel tanks, such as for propane, CNG, or hydrogen; small rocket motor cases; and compressed gas storage vessels such as for scuba tanks, breathing apparatuses or fire extinguishers.

The filament winding/wrapping apparatus 110 includes a fixture 112 onto which a selected object, such as an inflator subassembly designated 114, for example, can be rotationally fixed. More specifically, the inflator subassembly 114 is fixed at a selected angle from vertical designated $\alpha$, where $90°>\alpha>0°$. In accordance with certain preferred embodiments, the selected angle from vertical designated $\alpha$ that the inflator subassembly 114 is fixed is preferably $45°>\alpha>25°$.

Further, the fixture 112 and the inflator subassembly 114 fixed thereto can be rotated as shown by the arrow 116 about an axis of rotation 118.

The fixture 112 is secured on or to a rotatable planar platform 120, e.g., the rotatable platform 120 has an axis of rotation designated 122 and can be rotated as shown by the arrow 124 about the axis of rotation 122.

Also included is an eyelet 130 wherethrough a desired filament material, such as a resin impregnated TOW filament designated 132 is releasable from a filament dispensing assembly (not shown), such as known in the art. As will be appreciated, the eyelet 130 can be included in or with the filament winding/wrapping apparatus 110 as an integral part thereof or alternatively joined or connected therewith in cooperative operating fashion.

In the illustrated embodiment, the inflator subassembly 114 is generally composed of a shell member 140 having a generally elliptical, truncated bulbous or rounded disc form or shape. Those skilled in the art and guided the teaching herein provided, however, will appreciate that shell members of other forms or shapes can, if desired, be used. While spherical shaped shell members can be advantageous from a structural design view, the utilization of such a spherical shaped shell member can result in an inflator assembly of too great an overall height such as to hinder installation and placement of such an inflator assembly in a selected vehicle. On the other hand, the utilization of a flat, closed end shell member while generally resulting in a smaller or smallest height inflator assembly does not generally form as a strong a structural component as may be desired. Thus, the use of an elliptical shaped shell member can advantageously provide structural design while reducing the height of the resulting inflator assembly.

The shell member 140 can desirably be fabricated or formed of metal, such as drawn steel or aluminum, for example, wherein the metal is relatively thin as compared to conventional inflator pressure vessel housings. For example, whereas conventional pyrotechnic pressure vessel metal housings are commonly 2 to 3 mm thick, the invention permits the utilization of metal shell members having a thickness of less than 1 mm and in some cases having a thickness of less than 0.5 mm, e.g., a metal shell member having a thickness of 0.4 mm or less. In some preferred embodiments, the shell member can, if desired, be formed of plastic, such as plastic molded in a desired shape.

The subassembly 140 serves as or acts to at least in part define a combustion chamber wherein at least a portion of a quantity of gas generant material, such as a pyrotechnic material, is reactable to form product gas for inflation of an associated airbag cushion (not shown) and, as a result, to generate pressure within the combustion chamber.

A high pressure capable structure is created or formed by overwrapping the subassembly 140 with a selected material such as having the form of a composite. The subassembly 140 can and desirably does serve to hold together unassisted for the composite overwrap process.

The overwrap processing generally involves filament winding a composite material, such as composed of high strength fibers and a resin matrix system, around, about and/or over the subassembly 140 to form an overwrap thickness about the subassembly.

Various fiber materials such as known in the art can be used. For improved economics, in certain embodiment the use of glass fiber or basalt fiber materials are preferred.

In accordance with one aspect of the invention, the filament feed location is kept stationary and the object is manipulated to place the filaments on, around or about it. Thus, in accordance with one preferred embodiment of the invention, only two axis of movement are needed to create a helical winding pattern of filament around the object being wrapped, such as may be particularly desired where the object being wrapped is generally elliptical, truncated bulbous or rounded disc form or shape. Those skilled in the art and guided by the teaching herein provided will understand and appreciate that for the wrapping of an object or assembly of relatively greater lengthy, the presence or inclusion of hoop wraps can become more desirable.

Moreover, those movements are preferably desirably continuous in the same direction. Furthermore, in accordance with one preferred embodiment, the two axes are just "geared" to each other, either mechanically or electrically. Consequently, a helical wrap can be appropriately realized by simply fixing the object being wrapped at an appropriate desired proper angle and controlling the revolution rate of the table rotation axis (sometimes referred to as the "primary rotation axis"). The part rotation axis (sometimes referred to as the "secondary rotation axis") desirably is turned a proportional amount in relation to the primary axis to effectively control the filament spacing. Alternatively, the secondary axis can be indexed a fixed angular amount once for each rotation of the primary axis instead of being "geared" to the primary axis.

In practice, we have discovered it is generally desirable to wrap an object using 2 or more layers of the filament wrap material as such practice better allows or permits individual winding or wraps of the filament material to interlock together and thus form a stronger, more uniform and consistent overwrap. For example, the presence and inclusion of interlocking wraps or layers can better ensure that that individual filaments are less likely to slip or otherwise undesirably move when subjected to high or elevated pressures.

For example, a part with 3 layers of 23 wraps or windings per layer could be made with a gear ratio of the secondary axis to the primary axis of 0.0441. With such an arrangement, the first wrap occurs at a part rotation angle of 0°, the second wrap starts at 15.882° (360° table rotation angle× 0.0441), the third wrap starts at 31.765°, and so forth. Such processing also places the first wrap of the second layer (i.e., wrap 24) at 365.294° which lays ⅓ of the way between the first wrap and the second wrap. The first wrap of the third layer (i.e., wrap 47) ends up about ⅔ of the way between the first wrap and the second wrap. This creates a completely "filled in" pattern wherein the layers are desirably interlocked. In one embodiment, electrical gearing is preferred because different parts and wrapping patterns can be easily accommodated by adjusting part tilt angle and centroid, gear ratio, total table rotations, and eyelet position. In practice, wrapping at table rotation speeds up to 700 RPM has allowed the pattern described above to be wound in less than 9 seconds. In contrast, winding this pattern with conventional filament winding equipment would take several minutes.

The composite overwrapped subassembly can then be treated, such as by curing (e.g., UV or thermal curing) or melt processing of thermal plastic resins, for example, to form a desired inflator assembly. For example, in the case of a pyrotechnic inflator assembly, an inflator assembly that withstands the pressure generated within the combustion chamber upon reaction of the pyrotechnic material but wherein the shell member is incapable of withstanding the pressure generated within the combustion chamber upon reaction of the pyrotechnic material without support provided by the composite overwrap.

Such treatment or curing processing times can desirably be reduced or minimized by utilizing a UV cure resin system instead of common thermoset, elevated temperature cure resin systems. For example, a typical elevated temperature cure cycle involves heating at 120° C. for 90 minutes, while a UV cure system can affect cure in under 15 seconds when using an optically transparent fiber such as E-glass. UV curing has the additional safety advantage of avoiding subjecting the pyrotechnic material to elevated temperature such as could result in inadvertent actuation or other undesirable degradation of energetic materials, such as included or associated with either or both the initiator and the pyrotechnic material, for example.

The general practice of the invention is not necessarily limited to specific or particular resin materials nor to particular or specific methods of incorporating resin materials into composites as, in general, it is sufficient that the resin-treated filament is sufficiently tacky to appropriately maintain its position during the winding process.

One of two methods is typically employed for placing resin in impregnated fiber-based substrate material systems: 1) wet winding/layup or 2) pre-impregnating (sometimes referred to as "pre-preg"). For wet winding, a dry fiber is "wetted" with the resin as it is used, usually by submersion through a bath. This method is generally less expensive, but tends to be relatively messy and the "slickness" of the wet fiber may make it difficult to properly place the fiber-based substrate material, as well as keeping the material it in the proper position, on shaped work surfaces or a mandrel. The pre-impregnating method typically involves wetting the resin into the fiber-based substrate material in advance, which has conventionally included a step of partially curing the resin, so that it has a tacky consistency, and then winding up the fiber-based substrate material or storing it for later, subsequent use.

Pre-preg composite materials in use today commonly are based on thermoset resin systems, which cure when subjected to elevated temperatures. The use of pre-preg materials typically allows for faster placement of the fiber, is cleaner (e.g., creates much less mess during formation and shaping), and the tacky condition greatly improves the ability to keep the fibers in the proper position during placement and handling prior to full curing. Thus, from the perspective of a manufacturer, the use of pre-preg materials is preferred for use in many applications.

Moreover, those skilled in the art and guided by the teachings herein provided will understand and appreciate that the broader practice of the invention is not necessarily limited by or to the use of specific or particular resin materials. For example, suitable resin materials for use in the practice of the invention may, for example, include: an acrylate monomer, a methacrylate monomer, an oligomer species such as selected from the group consisting of: polyethers, polyesters, epoxies, and combinations thereof as well as combinations of one or more of such monomers and/or one or more of such oligomer species.

Thus, in addition to an apparatus for filament wrapping a composite material around an object, such as an inflator, the invention also encompasses and provides methods for filament wrapping a composite material around an object, such as an inflator subassembly, for example.

In one such method, the object to be wrapped is fixed onto a fixture of a filament wrapping apparatus at a selected angle from vertical designated $\alpha$, where $90°>\alpha>0°$. The filament wrapping apparatus has at least one of a first and second axis of rotation whereabout the object fixed onto the fixture is rotatable. The primary axis of rotation comprises the fixture secured onto a rotatable platform with the primary axis of rotation being perpendicular to the planar platform. The secondary axis of rotation longitudinally extends through the object. A composite material filament is released through an eyelet to wrap about the fixed object while rotation occurs about at least one of the primary and secondary axis of rotation.

In a particular embodiment, there is provided a method for helically wrapping a composite material filament around an inflator device subassembly. One such method involves fixing an inflator device subassembly onto a fixture of a filament wrapping apparatus at a selected angle from vertical designated $\alpha$, where $90°>\alpha>0°$. The filament wrapping apparatus has an axis of rotation extending through the inflator device (i.e., "part rotation axis") and whereabout the inflator device subassembly fixed onto the fixture is rotatable. Further, the fixture is secured onto a rotatable platform with an axis of rotation being perpendicular to the planar platform (i.e., "table rotation axis"). A composite material filament is released through an eyelet to helically wrap about the fixed inflator device subassembly while rotation occurs about at both the part rotation axis and the table rotation axis.

If an object or particular part design requires both helical and hoop wraps, a third axis of movement can be added to the eyelet such that the eyelet is moved in a direction parallel to the centerline axis of the part while rotating about the part rotation axis. In such a scenario, the hoop wraps would preferably be added or installed first and then the eyelet would be held stationary and the helical winding/wrapping procedure would follow to complete the part. As identified above, the addition or inclusion of hoop wraps may be generally desired when the object or assembly being wrapped is of relatively greater lengthy. For example, in the case of the wrapping of a cylindrical inflator, the inclusion of hoop wraps may become more desirably for longitudinally extending cylindrical inflators.

The invention provides improved filament winding or wrapping apparatus and methods such as more greatly permit or facilitate filament winding or wrapping of objects such as an inflator subassembly such as may be used in forming or making an inflator device such as used motor vehicle occupant safety restraint systems. The mass of inflator devices, such as the mass of pyrotechnic inflators, can desirably be reduced such as by replacing a thick walled pressure vessel, such as made of steel, as commonly used in such devices, with a lighter weight shell member that also has a composite overwrap.

For example, composite wrapping of inflator devices such as herein provided can desirably facilitate achieving inflator mass reductions of at least about 25%, preferably greater than 35% and, more preferably greater than 45% as compared to current state of the art pyrotechnic inflators using conventional steel housings.

Moreover, the filament wrapping of objects such as inflator subassemblies such as herein provided can also advantageously serve to: minimize or avoid welds such as commonly required with conventional multi-piece metal housings, significantly reduce the mass of the required inflator assembly, permit the use of the same composite material for various shaped and sized inflator assemblies, such as to significantly reduce the inventory of parts required to make different inflator devices, and facilitate design adjustment for specific or particular applications, for example, inflators designed for higher operating pressures can be accommodated by adjusting the amount of overwrap material applied to the shell member.

Moreover, in contrast to commercially available equipment such as primarily designed for aerospace applications that typically involve much wrapping or winding of parts of significantly larger physical dimensions and typically much smaller production quantities, the invention facilitates rapid and reliable placement of a structurally reinforcing composite overwrap onto an inflator housing, such as used in motor vehicle occupant safety restraint systems, such as of significantly smaller physical dimensions than prior aerospace applications and in processing time of no more than about 10 to 15 seconds per part, such as may be desired or required for practical application to production rates and quantities of inflator devices used in motor vehicle occupant safety restraint systems The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for filament wrapping a composite material around an object, the method comprising:
   fixing the object onto a fixture of a filament wrapping apparatus at a selected angle from vertical designated α, where 90°>α>0°, the filament wrapping apparatus having at least one of a primary and a secondary axis of rotation whereabout the object fixed onto the fixture is rotatable, where the primary axis of rotation comprises the fixture secured onto a rotatable platform with the primary axis of rotation being perpendicular to the planar platform and the secondary axis of rotation longitudinally extends through the object; and
   releasing a filament of the composite material through an eyelet to wrap about the fixed object while rotation occurs about at least one of the primary and secondary axis of rotation,
   wherein the filament of the composite material wraps the fixed object in a helical winding pattern.

2. The method of claim 1 wherein the object is an inflator device subassembly.

3. The method of claim 1 wherein the object has a rounded disc form.

4. The method of claim 1 wherein primary axis of rotation is geared to the secondary axis of rotation.

5. The method of claim 1 wherein the composite material filament comprises a resin-impregnated filament.

6. The method of claim 5 wherein the filament comprises glass or basalt fiber.

7. The method of claim 1 wherein the composite material filament additionally wraps the fixed object in a hoop wrap pattern.

8. The method of claim 1 where 45°>α>25°.

9. A method for helically wrapping a composite material filament around an inflator device subassembly, the method comprising:
   fixing the inflator device subassembly onto a fixture of a filament wrapping apparatus at a selected angle from vertical designated α, where 90°>α>0°, the filament wrapping apparatus having a primary axis of rotation and a secondary axis of rotation whereabout the object fixed onto the fixture is rotatable, where the primary axis of rotation comprises the fixture secured onto a rotatable platform with the primary axis of rotation being perpendicular to the planar platform and the secondary axis of rotation extending through the inflator device; and
   releasing the composite material filament through an eyelet to helically wrap about the fixed inflator device subassembly while rotation occurs about both the primary and the secondary axis of rotation.

10. The method of claim 9 wherein the inflator device subassembly has a rounded disc form.

11. The method of claim 9 wherein primary axis of rotation is geared to the secondary axis of rotation.

12. The method of claim 9 wherein the composite material filament wraps the fixed object in a helical winding pattern.

13. The method of claim 9 where 45°>α>25°.

14. A method for filament wrapping a composite material filament around an object, the method comprising:
   fixing the object onto a fixture of a filament wrapping apparatus at a selected angle from vertical designated α, where 45°>α>25°, the filament wrapping apparatus having at least one of a primary and a secondary axis of rotation whereabout the object fixed onto the fixture is rotatable, where the primary axis of rotation comprises the fixture secured onto a rotatable platform with the primary axis of rotation being perpendicular to the planar platform and the secondary axis of rotation longitudinally extends through the object; and
   releasing the composite material filament through an eyelet to wrap about the fixed object while rotation occurs about at least one of the primary and secondary axis of rotation.

15. The method of claim 14 wherein the object is an inflator device subassembly.

16. The method of claim 14 wherein the object has a rounded disc form.

17. The method of claim 14 wherein primary axis of rotation is geared to the secondary axis of rotation.

18. The method of claim 14 wherein the composite material filament comprises a resin-impregnated filament.

19. The method of claim 18 wherein the filament comprises glass or basalt fiber.

20. The method of claim 14 wherein the composite material filament wraps the fixed object in a helical winding pattern.

21. The method of claim 20 wherein the composite material filament additionally wraps the fixed object in a hoop wrap pattern.

* * * * *